(12) United States Patent
Shen et al.

(10) Patent No.: US 10,528,796 B2
(45) Date of Patent: Jan. 7, 2020

(54) BODY INFORMATION ANALYSIS APPARATUS WITH AUGMENTED REALITY AND EYEBROW SHAPE PREVIEW METHOD THEREOF

(71) Applicant: CAL-COMP BIG DATA, INC., New Taipei (TW)

(72) Inventors: Shyh-Yong Shen, New Taipei (TW); Min-Chang Chi, New Taipei (TW); Eric Budiman Gosno, ID (ID)

(73) Assignee: CAL-COMP BIG DATA, INC., New Taipei (TW)

( * ) Notice: Subject to any disclaimer, the term of this patent is extended or adjusted under 35 U.S.C. 154(b) by 141 days.

(21) Appl. No.: 15/870,987

(22) Filed: Jan. 14, 2018

(65) Prior Publication Data

US 2019/0095697 A1 Mar. 28, 2019

(30) Foreign Application Priority Data

Sep. 28, 2017 (CN) .......................... 2017 1 0897603

(51) Int. Cl.
*G06K 9/00* (2006.01)
*G06T 7/73* (2017.01)
(Continued)

(52) U.S. Cl.
CPC ....... *G06K 9/00248* (2013.01); *A45D 44/005* (2013.01); *G06K 9/0061* (2013.01);
(Continued)

(58) Field of Classification Search
CPC ............. G06K 9/00248; G06K 9/0061; G06K 9/00281; G06K 9/00261; A45D 44/005; G06T 7/73; G06T 7/11
(Continued)

(56) References Cited

U.S. PATENT DOCUMENTS 9,760,935 B2 * 9/2017 Aarabi ............... G06Q 30/0631
2007/0047761 A1 * 3/2007 Wasilunas ............ A45D 44/005
382/100
(Continued)

FOREIGN PATENT DOCUMENTS

CN 107292220 * 10/2017
CN 107292812 * 10/2017
(Continued)

OTHER PUBLICATIONS

Office Action dated Dec. 18, 2018 of the corresponding Japan patent application.
(Continued)

*Primary Examiner* — Jerome Grant, II
(74) *Attorney, Agent, or Firm* — Chun-Ming Shih; HDLS IPR Services

(57) ABSTRACT

A body information analysis apparatus (1) with augmented reality and an eyebrow shape preview method thereof are provided. The method includes following steps of: capturing a face image (51); recognizing an eye image from the face image (51); calculating a projection position (73) according to a position of the eye image and an eyebrow offset; displaying the face image (51) and a sample eyebrow image (81,82) at the projection position (73) in a preview mode; and, displaying the face image (51) and an outline eyebrow shape pattern (71,72) at the projection position (73) in an auxiliary mode. Therefore, the dissatisfaction for the shaped eyebrow shape from the user can be prevented, and the technical threshold of eyebrow-shaping can be reduced significantly, and a probability of shaping eyebrows successfully can be increased as well.

12 Claims, 13 Drawing Sheets

(51) Int. Cl.
   *G06T 7/11*      (2017.01)
   *A45D 44/00*    (2006.01)
(52) U.S. Cl.
   CPC ..... *G06K 9/00261* (2013.01); *G06K 9/00281* (2013.01); *G06T 7/11* (2017.01); *G06T 7/73* (2017.01)
(58) Field of Classification Search
   USPC .......................................................... 382/118
   See application file for complete search history.

(56) References Cited

U.S. PATENT DOCUMENTS

| | | | | |
|---|---|---|---|---|
| 2010/0130250 | A1* | 5/2010 | Choi | G06K 9/3241 |
| | | | | 455/556.1 |
| 2018/0271257 | A1* | 9/2018 | Shlomov | G06T 7/68 |
| 2019/0065830 | A1* | 2/2019 | Shen | G06K 9/00281 |

FOREIGN PATENT DOCUMENTS

| | | | | |
|---|---|---|---|---|
| CN | 107464253 | * | 12/2017 | |
| JP | H11025253 | A | 1/1999 | |
| JP | H11143352 | A | 5/1999 | |
| JP | 2000011144 | A | 1/2000 | |
| JP | 3671260 | * | 7/2005 | ............. G06T 11/80 |
| JP | 2006247012 | * | 9/2006 | ............. A45D 40/30 |
| JP | 2007293649 | A | 11/2007 | |

OTHER PUBLICATIONS

Search Report dated Aug. 16, 2018 of the corresponding European patent application.

* cited by examiner

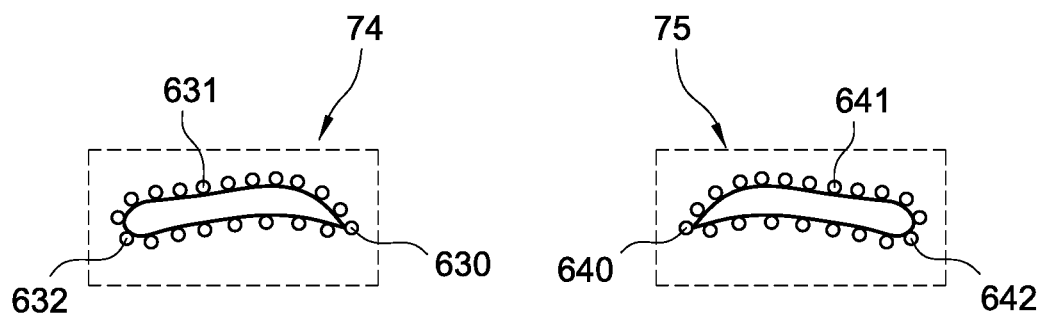
FIG.16　　　　　　FIG.17
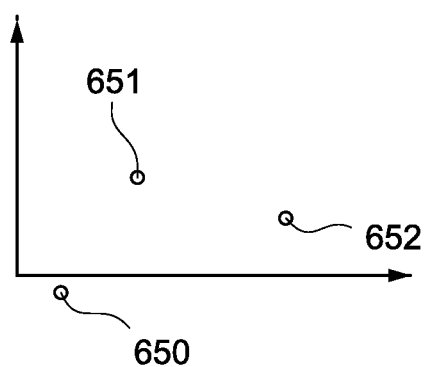　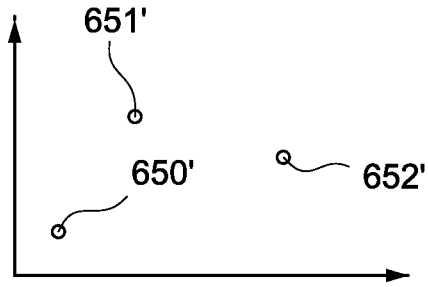
FIG.18A　　　　　　FIG.18B
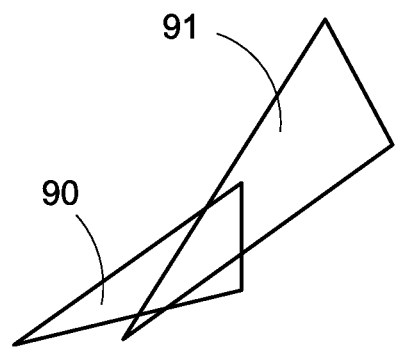　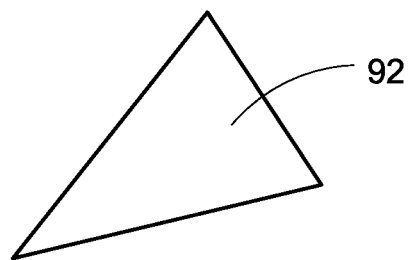
FIG.19A　　　　　　FIG.19B

BODY INFORMATION ANALYSIS APPARATUS WITH AUGMENTED REALITY AND EYEBROW SHAPE PREVIEW METHOD THEREOF

BACKGROUND OF THE INVENTION

Field of the Invention

The technical field relates to apparatus and method, and more particularly related to body information analysis apparatus with augmented reality and an eyebrow shape preview method thereof.

Description of Related Art

Eyebrow-shaping is one of the highly skilled makeup skills. A perfect eyebrow-shaping has ability of changing a visual effect of a people's face shape and improving an appearance impression of the people.

In general, users shape their eyebrows by themselves when sitting in front of a mirror, or shapes their eyebrows via replacing the mirror with a camera and a screen of a smart phone.

However, the users usually only have ability of imagining whether the shaped eyebrow shapes are suitable for their face shapes before eyebrow-shaping. Moreover, when shaping their eyebrows, the users must shape their eyebrows according to imagination. As a result, the users having the poor eyebrow-shaping skill usually find that the eyebrow is not suitable for their face shapes after eyebrow-shaping. Besides, the users having the poor eyebrow-shaping skill usually feel troubled about a speed of shaping their eyebrows being too slow or their shaped eyebrow shapes being different from the imaginational eyebrow shapes.

Accordingly, there is currently a need for an auxiliary apparatus having ability of assisting the inexperienced users in selection of suitable eyebrow shape and eyebrow-shaping efficiently.

SUMMARY OF THE INVENTION

The present disclosed example is directed to body information analysis apparatus with augmented reality and an eyebrow shape preview method thereof, the apparatus and the method have ability of assisting the user in selection of suitable eyebrow shape and eyebrow-shaping via Augmented Reality technology.

One of the exemplary embodiments, an eyebrow shape preview method with augmented reality applied to a body information analysis apparatus, comprises following steps of: controlling an image capture module of the body information analysis apparatus to capture a face image; controlling a process unit of the body information analysis apparatus to recognize an eye image from the face image; calculating a projection position according to a position of the eye image and an eyebrow offset at the process unit; synthesizing the face image and a sample eyebrow image into a synthetic image according to the projection position in a preview mode, and controlling a display module of the body information analysis apparatus to display the synthetic image; and, controlling the display module to display the face image, and display an outline eyebrow shape pattern corresponding to the sample eyebrow image at the projection position in an auxiliary mode.

One of the exemplary embodiments, a body information analysis apparatus with augmented reality, comprises an image capture module, a process unit and a display module. The image capture module is used to capture a face image. The process unit is electrically connected to the image capture module, and recognizes an eye image in the face image, and calculates a projection position according to a position of the eye image and an eyebrow offset. The display module displays a synthetic image in a preview mode, wherein the synthetic image is generated at the process unit by synthesizing the face image and a sample eyebrow image according to the projection position, the display module displays the face image, and display an outline eyebrow shape pattern corresponding to the sample eyebrow image at the projection position in an auxiliary mode.

The present disclosed example can allow the user to preview a result of eyebrow-shaping via a preview mode, and effectively prevent the user from being dissatisfied with the shaped eyebrow shape. The present disclosed example can assist the user in intuitive and accurate eyebrow-shaping via an auxiliary mode, reduce the technical threshold of eyebrow-shaping significantly, and increase a probability of shaping eyebrows successfully.

BRIEF DESCRIPTION OF DRAWING

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

FIG. 16 is a first schematic view of feature analysis according to the present disclosed example;

FIG. 17 is a second schematic view of feature analysis according to the present disclosed example;

FIG. 18A is a schematic view of a projection position before adjustment according to the present disclosed example;

FIG. 18B is a schematic view of a projection position after adjustment according to the present disclosed example;

FIG. 19A is a schematic view of an eyebrow shape before adjustment according to the present disclosed example; and FIG. 19B is a schematic view of an eyebrow shape after adjustment according to the present disclosed example.

DETAILED DESCRIPTION OF THE INVENTION

In cooperation with attached drawings, the technical contents and detailed description of the present disclosed example are described thereinafter according to a preferable embodiment, being not used to limit its executing scope. Any equivalent variation and modification made according to appended claims is all covered by the claims claimed by the present disclosed example.

The present disclosed example disclosed a body information analysis apparatus 1 (referred to as analysis apparatus 1 in following description), the analysis apparatus is mainly used to perform an eyebrow shape preview method (referred to as preview method in following description) for assisting a user in previewing the visual effects of the various eyebrows shapes, comparing a current eyebrow shape with a suggested eyebrow shape and shaping his/her eyebrows.

Figure 1:
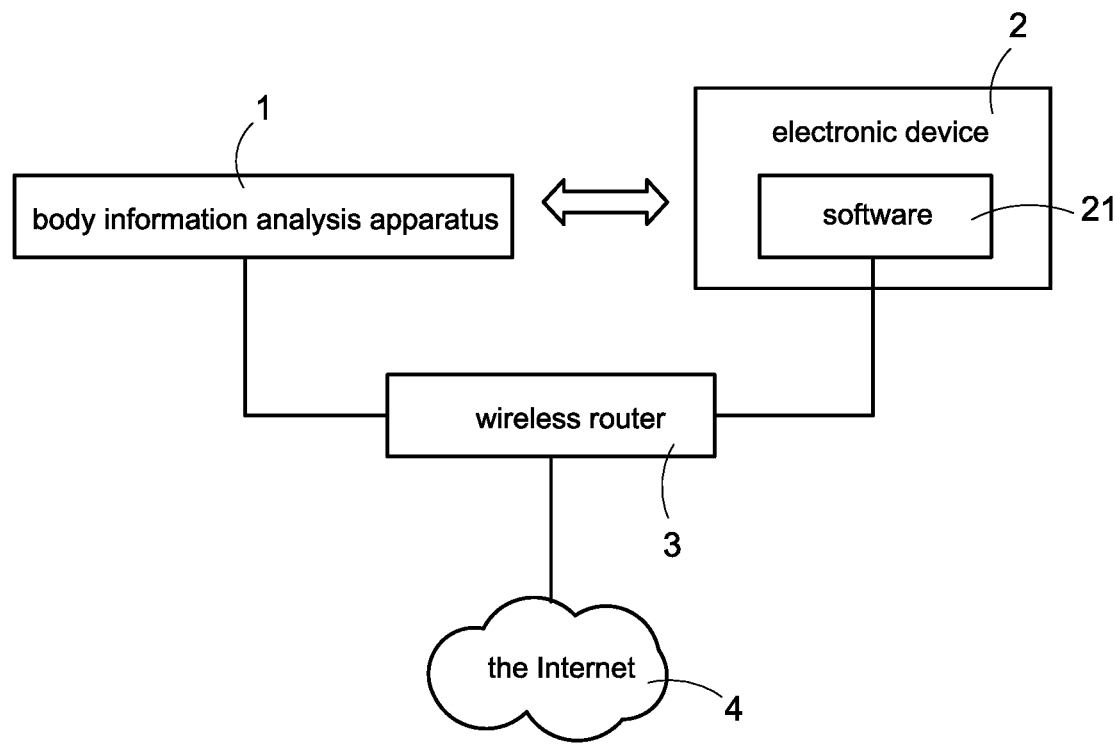
FIG. 1 is an architecture diagram of a system according to the first embodiment of the present disclosed example.

Please refer to FIG. 1 which is an architecture diagram of a system according to the first embodiment of the present disclosed example. In the embodiment shown in FIG. 1, the user may operate an electronic device 2 to configure the analysis apparatus 1.

More specifically, there is a software 21 installed in a memory (not shown in figure) of the electronic device 2. The software 21 (such as an application program developed and provided by a manufacturer of the analysis apparatus 1) is used to control the electronic device 2 to establish a connection with the analysis apparatus 1. Besides, the user may operate the software 21 to input various configuration operations, such as inputting the user's data, registering the user's face image, configuring various default values and so forth.

Figure 4:
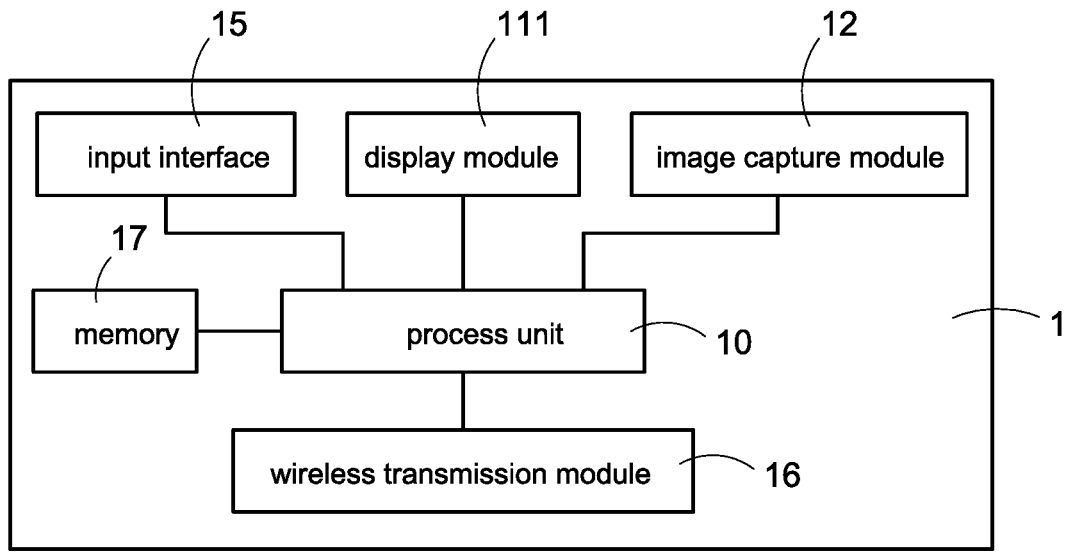
FIG. 4 is an architecture diagram of a body information analysis apparatus according to the first embodiment of the present disclosed example.

One of the exemplary embodiments, the user may directly operate an input interface of the analysis apparatus 1, such as an input interface 15 shown in FIG. 4, to input various configuration operations.

One of the exemplary embodiments, a wireless transmission module 16 of the analysis apparatus 1 may implement the data transmission with the electronic device 2 via Wi-Fi communication technology, Bluetooth communication technology, Zig-bee communication technology, radio frequency (RF) communication technology, infrared communication technology, fiber-optic communication technology, voice communication technology and/or the other wireless communication technologies.

One of the exemplary embodiments, the analysis apparatus 1 may connect to a wireless router 3 located in the same region for connecting to the Internet 4 via the wireless router 3. Thus, the analysis apparatus 1 may execute the operation of updating its firmware, uploading data, downloading data and so forth via the Internet 4. Besides, the analysis apparatus 1 may further transfer the user's body information, such as face image, eyebrow image, mirror eyebrow shape pattern and so forth described later, to a remote computer equipment (not shown in figure) via the Internet 4 for making the user have ability of viewing the information remotely, or achieving the purpose of remote replication.

Figure 2:
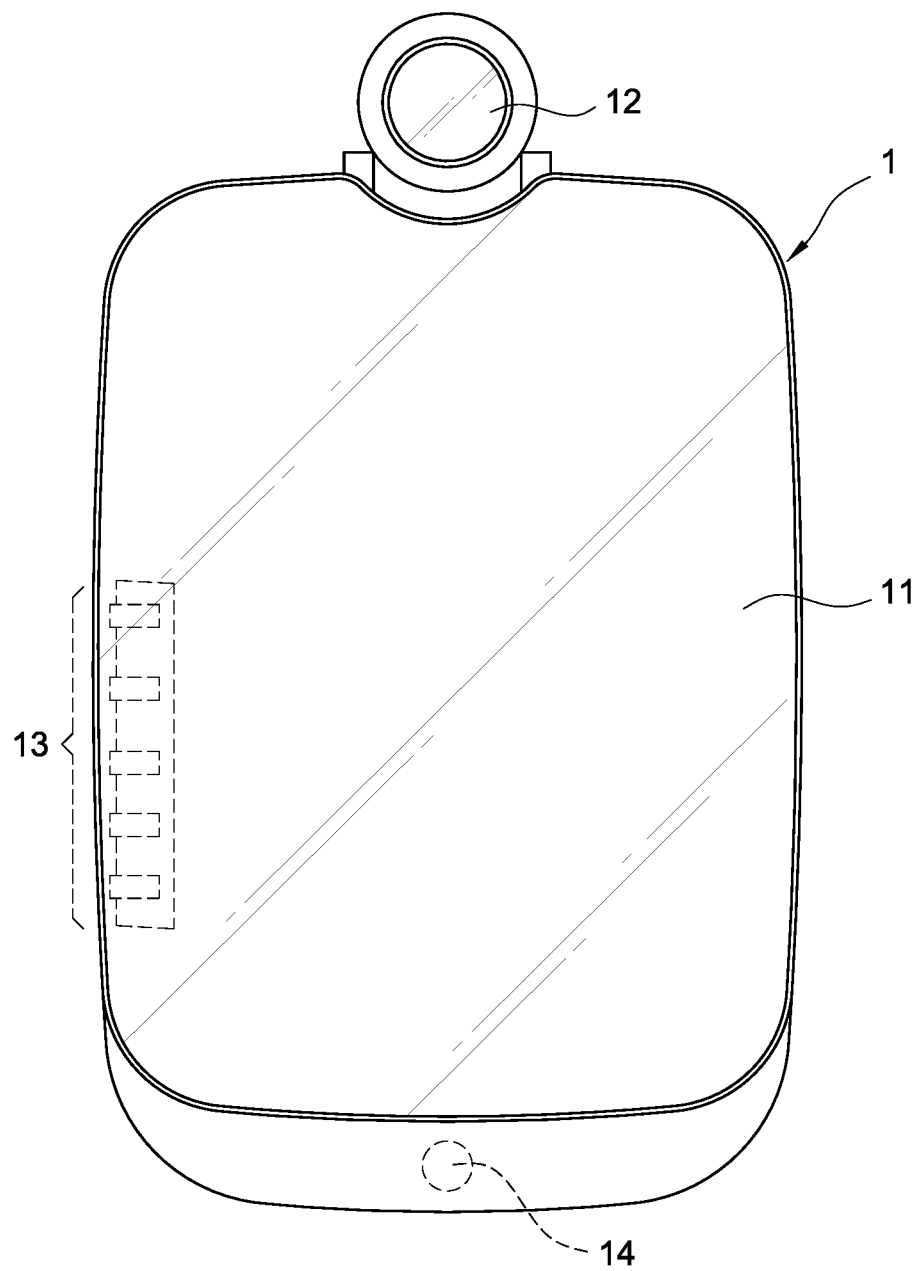
FIG. 2 is a first schematic view of a body information analysis apparatus according to the present disclosed example.
Figure 3:
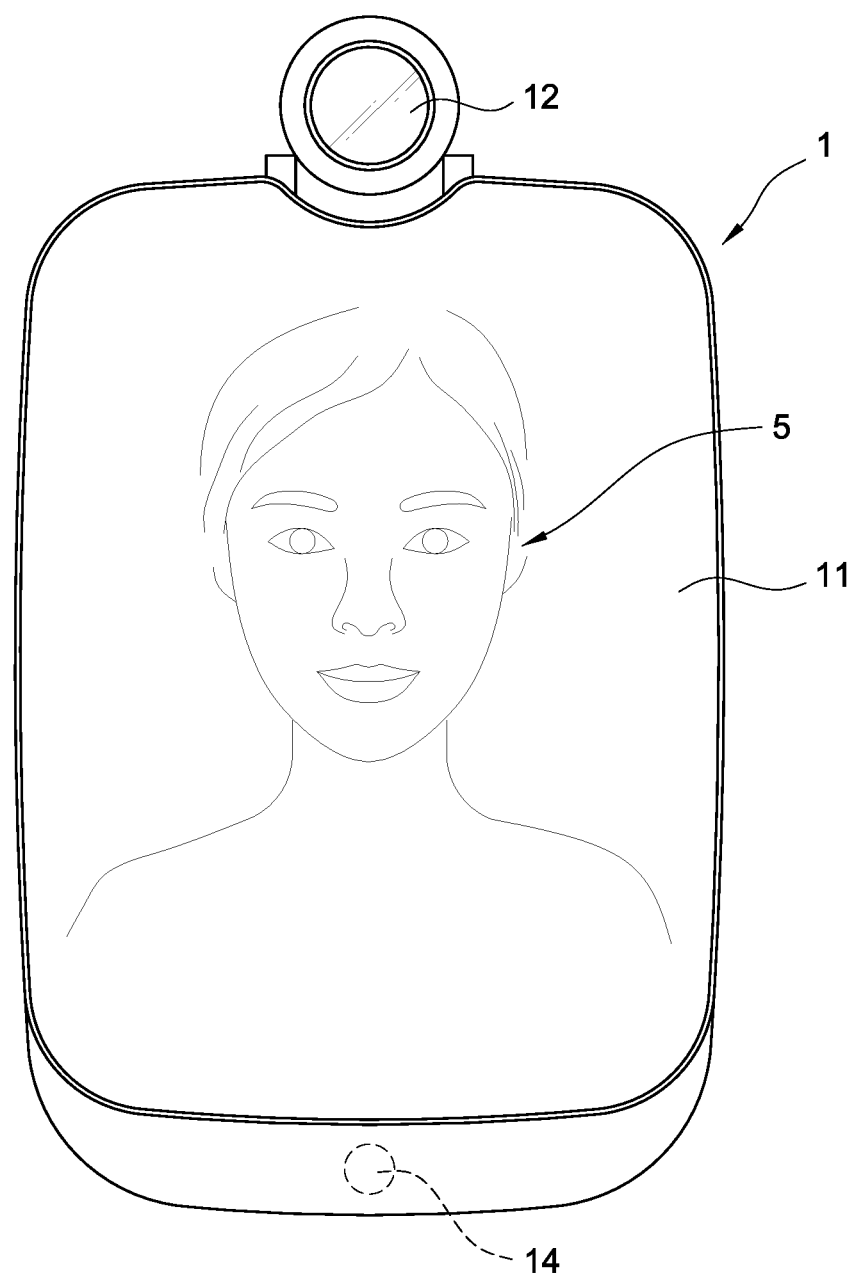
FIG. 3 is a second schematic view of a body information analysis apparatus according to the present disclosed example.

Please refer to FIG. 2 and FIG. 3 simultaneously, FIG. 2 is a first schematic view of a body information analysis apparatus according to the present disclosed example, FIG. 3 is a second schematic view of a body information analysis apparatus according to the present disclosed example. The analysis apparatus 1 shown in FIG. 2 and FIG. 3 is mainly arranged in bedroom or restroom of the user's home for leading the user to accept a detection and analysis of body information, such as face, neck or hands.

The analysis apparatus 1 comprises a mirror screen 11. The analysis apparatus 1 may display a graphical user interface (GUI) via the mirror screen 11 after booting (as shown in FIG. 2), and may interact with the user via the displayed GUI. Moreover, the mirror screen 11 may be used as a simple mirror for reflecting an optical mirror image 5 of the user after shutting down (as shown in FIG. 3).

The present disclosed example mainly assists the user in previewing a result of makeup and assists the user to make up, such as eyebrow-shaping, via the analysis apparatus 1. For achieving this purpose, the mirror screen 11 may display the GUI and reflect the optical mirror image 5 of the user simultaneously for analyzing the user's makeup and assisting the user (described later) during the user making up.

One of the exemplary embodiments, the analysis apparatus further comprises an image capture module 12 arranged on the analysis apparatus 1. A shooting angle of the image capture module 12 is adjustable. One of the exemplary embodiments, the image capture module 12 is used to shoot the user for obtaining one or more high resolution image(s), such as face image(s), neck image(s), hand image(s) and so forth. The analysis apparatus 1 may analyze the body information of the user and a progress of makeup via the captured image(s). One of the exemplary embodiments, the image capture module 12 may capture an external message, such as one-dimension barcode, two-dimensional barcode and so forth, for retrieving the corresponded data via a content of the external message.

Besides, the analysis apparatus 1 is configured to immediately display image captured by the image capture module 12 on the mirror screen 11. Thus, even the mirror screen 11 doesn't be power off, the user may immediately see the user's electronic mirror image 5 on the mirror screen 11.

Furthermore, the analysis apparatus 1 may immediately process the captured image, such as rendering a mark (For example, a mirror eyebrow shape pattern described later) or a set of indication graph(s) and/or indication text(s) for assisting the user in eyebrow-shaping, and display the rendered image on the mirror screen 11.

Thus, the analysis apparatus 1 can display the auxiliary information on the mirror display 11 immediately and intuitively via Augmented Reality (AR) technology when the user makes up, and effectively improve the user experience.

One of the exemplary embodiments, the mirror screen 11 may be a touch screen, the user may operate the analysis apparatus 1 for inputting data via the mirror screen 11.

The analysis apparatus 1 may further comprise a plurality of keys 13. In this embodiment, the keys 13 may be physical buttons or touch keys, but this specific example is not intended to limit the scope of the present disclosed example. The user may operate the GUI (such as controlling the GUI to trigger a command of going back to the homepage, going back to the previous webpage or going to the next webpage) or quickly control the analysis apparatus 1 to implement the function (such as turning on the mirror screen 11, turning off the mirror screen 11, enabling the image capture module 12 and so forth) corresponding to the hot keys via pressing the keys 13.

The analysis apparatus 1 may further comprise one or more sensor(s) 14 (such as temperature sensor, humidity sensor and so forth) used to sensing environmental data of an environment which the analysis apparatus 1 is arranged. Thus, the present disclosed example can improve the accuracy of detection and analysis of the user's body information generated by the analysis apparatus 1. One of the exemplary embodiments, above-mentioned sensor 14 may be a motion sensor, the analysis apparatus 1 may sense a motion gesture (such as waving left, waving right, waving up, waving down, reaching forward, withdrawing hand back and so forth) of the user via the motion sensor. Therefore, the user may input a data-inputting operation to the analysis apparatus 1 via inputting motion gesture without touching the mirror screen 11 or keys 13, and prevent form residue of fingerprints.

Please refer to FIG. 4, which is an architecture diagram of a body information analysis apparatus according to the first embodiment of the present disclosed example. As shown in FIG. 4, the analysis apparatus 1 mainly comprises a display module 111, image capture module 12, input interface 15, wireless transmission module 16, memory 17, and a process unit 10 electrically connected to above-mentioned devices.

One of the exemplary embodiments, the image capture module 12 is a camera or a video recorder and is used to capture an external image (such as a face image of the user) and/or an external message. The analysis apparatus 1 may recognize an image of the user (such as eyebrow recognition, face recognition, neck recognition, hand recognition and so forth) in the external image for analyzing a part (such as eyebrows, face, neck or hands) of the user or executing a corresponding operation according to a content of the external message.

The display module 111 is configured to display above-mentioned GUI. One of the exemplary embodiments, the display module 111 is arranged in the mirror screen 11. When the display module 111 is enabled, light of the display module 111 may be transmitted though the unidirectional glass (not shown in figure) of the mirror screen 11 and project on the eyes of the user, so as to making the user have ability of seeing the GUI on the mirror screen 11. When the display module 111 is disabled, the user only has ability of seeing the user's optical mirror image 5 on the mirror screen 11. One of the exemplary embodiments, the analysis apparatus 1 may further adjust an intensity of the light source or range of a display region for making the mirror screen 11 has ability of reflection of the user's optical mirror image 5 and displaying the GUI simultaneously.

The analysis apparatus 1 receives the user's external input via the input interface 15. Thus, the user may interact with the GUI or input a desired configuration operation. One of the exemplary embodiments, the input interface 15 may be above-mentioned sensor 14 used to sense the gesture input of the user. One of the exemplary embodiments, the input interface 15 may be above-mentioned image capture module 12 used to capture the external image or the external message. One of the exemplary embodiments, the input interface 15 may be a touch screen or keys 13 used to receive an input operation of the user. One of the exemplary embodiments, the input interface 15 may be a microphone used to receive an external audio.

The wireless transmission module 16 is used to connect to the Internet 4. More specifically, the user may operate electronic device 2 to connect to the analysis apparatus 1 remotely via the Internet 4 for viewing the various information (such as body information) recorded by the analysis apparatus 1 at any time. The memory 17 is used to store data.

The process unit 10 is connected to the display module 111, the image capture module 12, the input interface 15, the wireless transmission module 16 and the memory 17. The memory 17 (such as non-transient storage media) stores the computer-executable codes (not shown in figure). The process unit 10 may further implement the preview method of the present disclosed example via the execution of the computer-executable codes.

Figure 5:
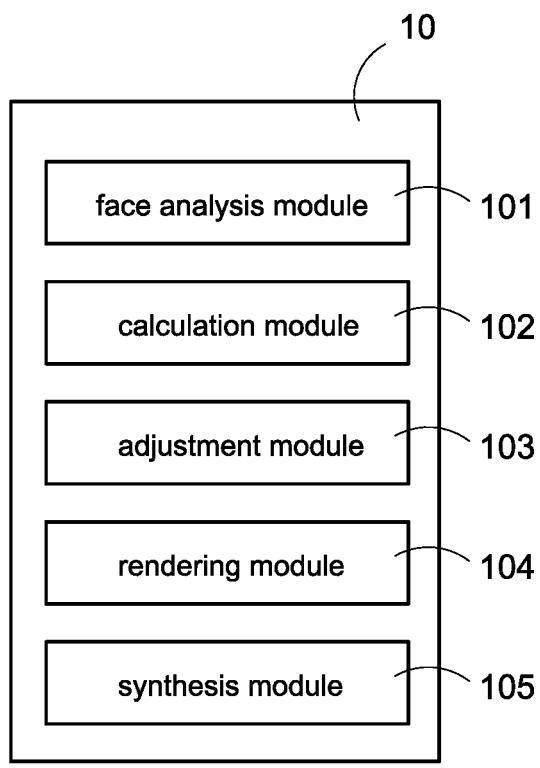
FIG. 5 is a schematic view of a process unit according to the first embodiment of the present disclosed example.

Please refer to FIG. 5, which is a schematic view of a process unit according to the first embodiment of the present disclosed example. More specifically, the process unit 10 mainly implement each function of the preview method of the present disclosed example via the execution of the computer-executable codes. Moreover, above-mentioned computer-executable codes may be divided into following function modules according to the different functions.

1. face analysis module 101, the face analysis module 101 is used to execute a face analysis process to the face image captured by the image capture module 12. More specifically, the face analysis module 101 may recognize image of each part (such as eyebrow image, eye image, nose image, ear image, mouth image and so forth) of the face in the face image. One of the exemplary embodiments, the face analysis module 101 may executes the face analysis process to the face image for recognizing a plurality of feature points (such as the feature points 6 shown in FIG. 9) of each part of the face. Moreover, the feature points of each part correspond to the different features of each part (such as eyebrow head, eyebrow peak and eyebrow tail of the eyebrows, nose bridge, nose head or nose wings of the nose, or eye head or eye tail of the eyes) of the face.

2. calculation module 102, the calculation module 102 is used to calculate an eyebrow offset between the eyes and the eyebrows of the user, and calculate a projection position of a projection pattern of the sample eyebrow image selected by the user or above-mentioned specific part according to the eyebrow offset.

3. adjustment module 103, the adjustment module 103 is used to calculate an adjustment parameter set according to the eyebrow shapes of the eyebrows of the user and the eyebrow shapes of the selected sample eyebrow image, and adjust size, angle, or position of the sample eyebrow image according to the adjustment parameter set to make the adjusted sample eyebrow image are more similar as the eyebrows of the user and look natural.

4. rendering module 104, the rendering module 104 is used to render above-mentioned projection pattern.

5. synthesis module 105, the synthesis module 105 is used to synthesize a plurality of images into signal synthetic image.

One of the exemplary embodiments, the face analysis module 101 recognizes a plurality of eyebrow feature points of each eyebrow image in the face image. The calculation module 102 calculates the eyebrow offset, and calculates the projection position according to the eyebrow offset. The adjustment module 103 calculates adjustment parameter set, and adjusts the sample eyebrow image according to the adjustment parameter set. The rendering module 104 renders the outline eyebrow shape pattern (a projection pattern used to instruct an outline or a range of the eyebrow) according to the sample feature points of the (adjusted) sample eyebrow image. The synthesis module 105 synthesizes the face image and the sample eyebrow image into the synthetic image according to the projection position. Finally, the process unit 10 controls the display module 111 to display the synthetic image in the preview mode, and controls the display module 111 to display the face image and the outline eyebrow shape pattern in the auxiliary mode simultaneously.

Thus, the present disclosed example can display a simulated eyebrow-shaping effect (namely, the sample eyebrow image) in the preview mode, and provide the user a reference for selection of eyebrow shapes. Besides, the present disclosed example can project the outline eyebrow shape pattern at the suitable position in the auxiliary mode, and provide the user a reference for makeup.

Figure 9:
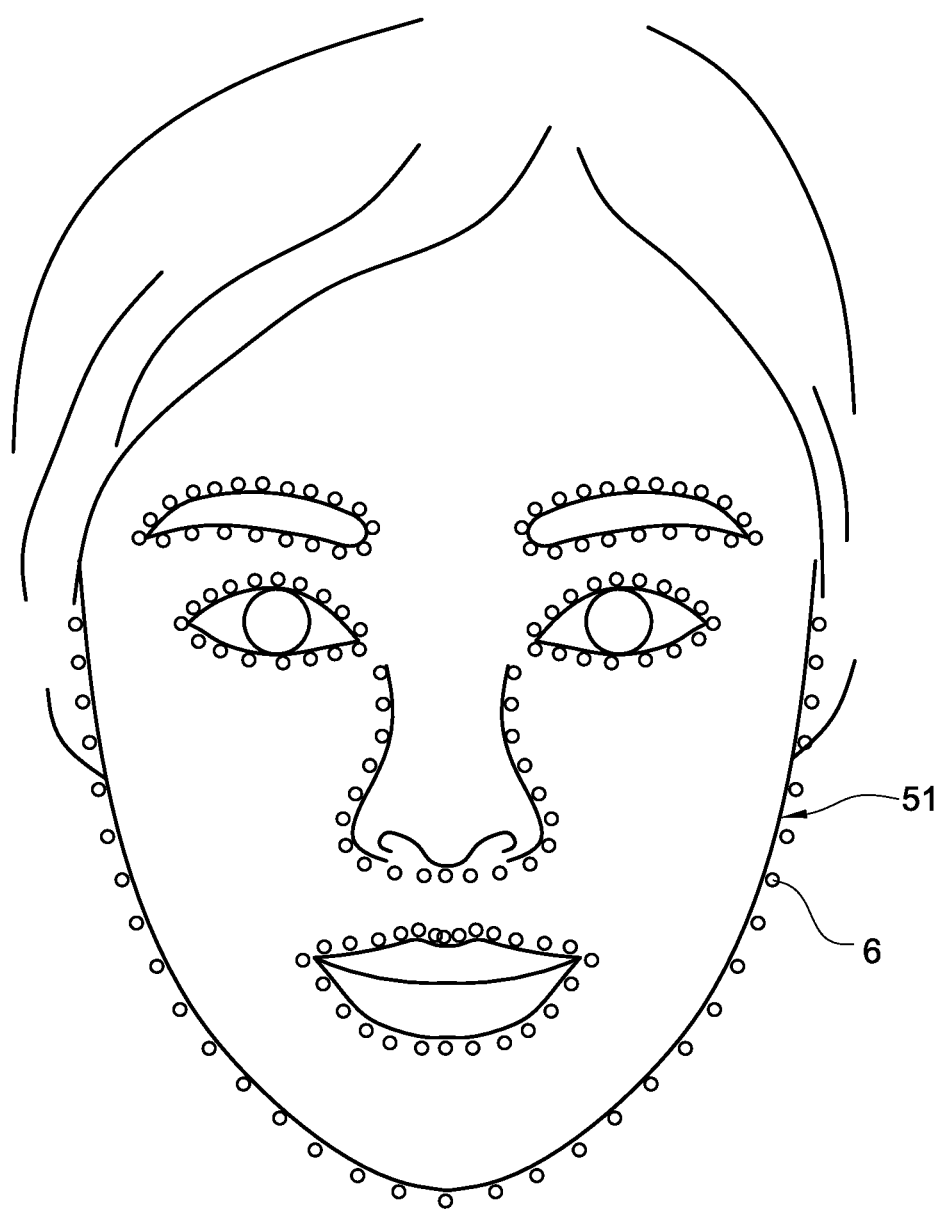
FIG. 9 is a schematic view of face analysis according to the present disclosed example.
Figure 10:
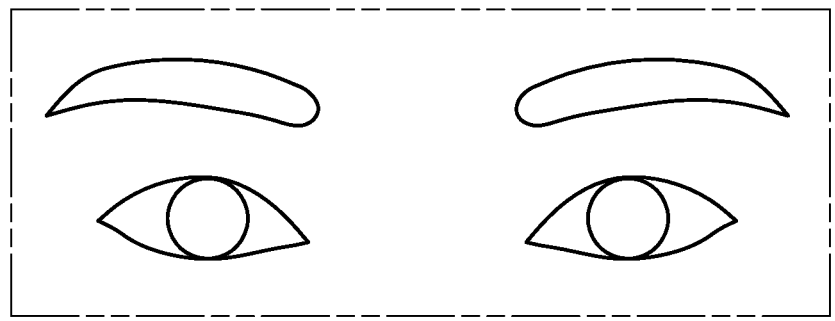
FIG. 10 is a schematic view of original face image according to the present disclosed example.
Figure 11:
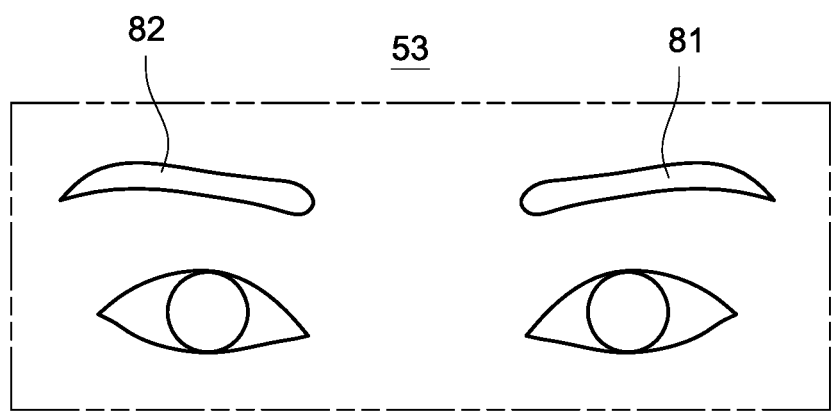
FIG. 11 is a schematic view of display screen of a preview mode according to the present disclosed example.
Figure 12:
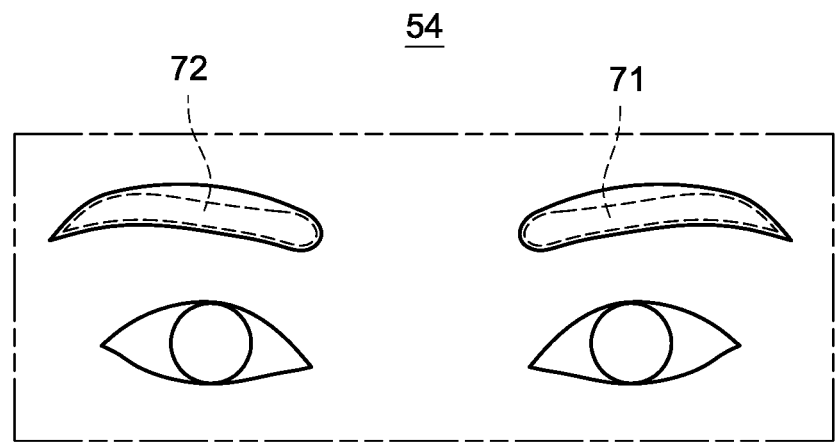
FIG. 12 is a schematic view of display screen of an auxiliary mode according to the present disclosed example.

Please refer to FIG. 6 and FIG. 9-12, FIG. 6 is a flowchart of an eyebrow shape preview according to the first embodiment of the present disclosed example, FIG. 9 is a schematic view of face analysis according to the present disclosed example, FIG. 10 is a schematic view of original face image according to the present disclosed example, FIG. 11 is a schematic view of display screen of a preview mode according to the present disclosed example, and FIG. 12 is a schematic view of display screen of an auxiliary mode according to the present disclosed example. The analysis apparatus 1 of the present disclosed example performs each step of the preview method of each embodiment of the present disclosed example via controlling the process unit 10 to execute above-mentioned computer-executable codes (such as above-mentioned function module 101-105).

The preview method of this embodiment comprises following steps for implementing the function of preview and auxiliary comparison of eyebrow shapes.

Step S100: the process unit 10 of the analysis apparatus 1 retrieves a sample eyebrow image (as the sample eyebrow image 81-82 shown in FIG. 11), and retrieves an outline eyebrow shape pattern (as the outline eyebrow shape pattern 71-72 shown in FIG. 12) corresponding to the retrieved sample eyebrow image.

One of the exemplary embodiments, the memory 17 of the analysis apparatus 1 may store a plurality of the different sample eyebrow images and each outline eyebrow shape pattern respectively corresponding to each sample eyebrow image, wherein each sample eyebrow image corresponds to the different eyebrow shape.

Process unit 10 may display a plurality of sample eyebrow images via the display module 111 or the electronic device 2. Moreover, the user may operate the input interface 15 to input a selection operation of selecting one of the sample eyebrow images, or send a selection command of selecting one of the sample eyebrow images to the analysis apparatus 1 for selecting one of the sample eyebrow images arbitrarily. Finally, the process unit 10 load the sample eyebrow image selected by the user and the corresponding outline eyebrow shape pattern form the memory 17 according to the selection operation or the selection command.

One of the exemplary embodiments, the memory 17 doesn't store each outline eyebrow shape pattern corresponding to each sample eyebrow image. The process unit 10 calculated the outline eyebrow shape pattern corresponding to the selected sample eyebrow image immediately after the specific sample eyebrow image is selected. Thus, the present disclosed example can reduce the usage of storage space of the memory 17 effectively.

Step S102: the process unit 10 controls the image capture module 12 to shoot a face of the user for capturing a face image (as the face image 51 shown in FIG. 9) of the user.

One of the exemplary embodiments, the process unit 10 may control the display screen 111 to display the captured face image 51 (as the display screen 52 shown in FIG. 10) immediately for implementing an effect of electronic mirror.

More specifically, the analysis apparatus 1 of the present disclosed example may perform the step S100 or the step S102 selectively (namely, the analysis apparatus 1 is configured to first do one of leading the user to select the sample eyebrow image or capturing the user's face image), but this specific example is not intended to limit the scope of the present disclosed example.

Step S104: the process unit 10 executes the face analysis process to the captured face image 51 for recognizing the eye image(s) in the face image 51.

One of the exemplary embodiments, the process unit 10 analyzes the face image 51 via the face analysis module 101 for recognizing the image of parts (such as face contour, eyes, eyebrows, nose, mouth, ears and the other parts of face) of the face, and selects the eye image(s) for process.

One of the exemplary embodiments, above-mentioned face analysis process is configured to analyze the face image 51 via execution of the Face Landmark Algorithm for determining a position of the specific part of face in the face image 51, but this specific example is not intended to limit the scope of the present disclosed example. Furthermore, above-mentioned Face Landmark Algorithm is implemented by the Dlib Library.

Please refer to FIG. 9, during execution of face analysis process, the face analysis module 101 first analyzes the face image 51 via execution of above-mentioned Face Landmark Algorithm. Above-mentioned Face Landmark Algorithm is a commonly technology in the art of the present disclosed example. The Face Landmark Algorithm is used to analyze the face in the face image 51 based on Machine Learning technology for recognizing a plurality of feature points 6 (such as eyebrow peak and eyebrow head, eye tail and eye head, nose bridge and nose wind, pinna and earlobe, and so forth, the number of the feature points 6 may be 68 or 198) of one or more specific part(s) (such as eyebrows, eyes, nose or ears) of the face. Moreover, above-mentioned Face Landmark Algorithm may further mark a plurality of marks of the feature points 6 of the specific part(s) on the face image 51.

One of the exemplary embodiments, the face analysis module 101 may number each feature point 6 according to the part and the feature corresponding to each feature point 6.

Thus, the present disclosed example can determine the position of each part of the face in the face image 51 according to the information of numbers, shapes, sorts and so forth of the feature points. In the present disclosed example, the analysis apparatus 1 recognizes at least of left eyebrow and right eyebrow (corresponding to the eyebrow images), left eye and right eye (corresponding to the eye images), and so on in the face image 51 according to the feature points 6, but this specific example is not intended to limit the scope of the present disclosed example.

Figure 6:
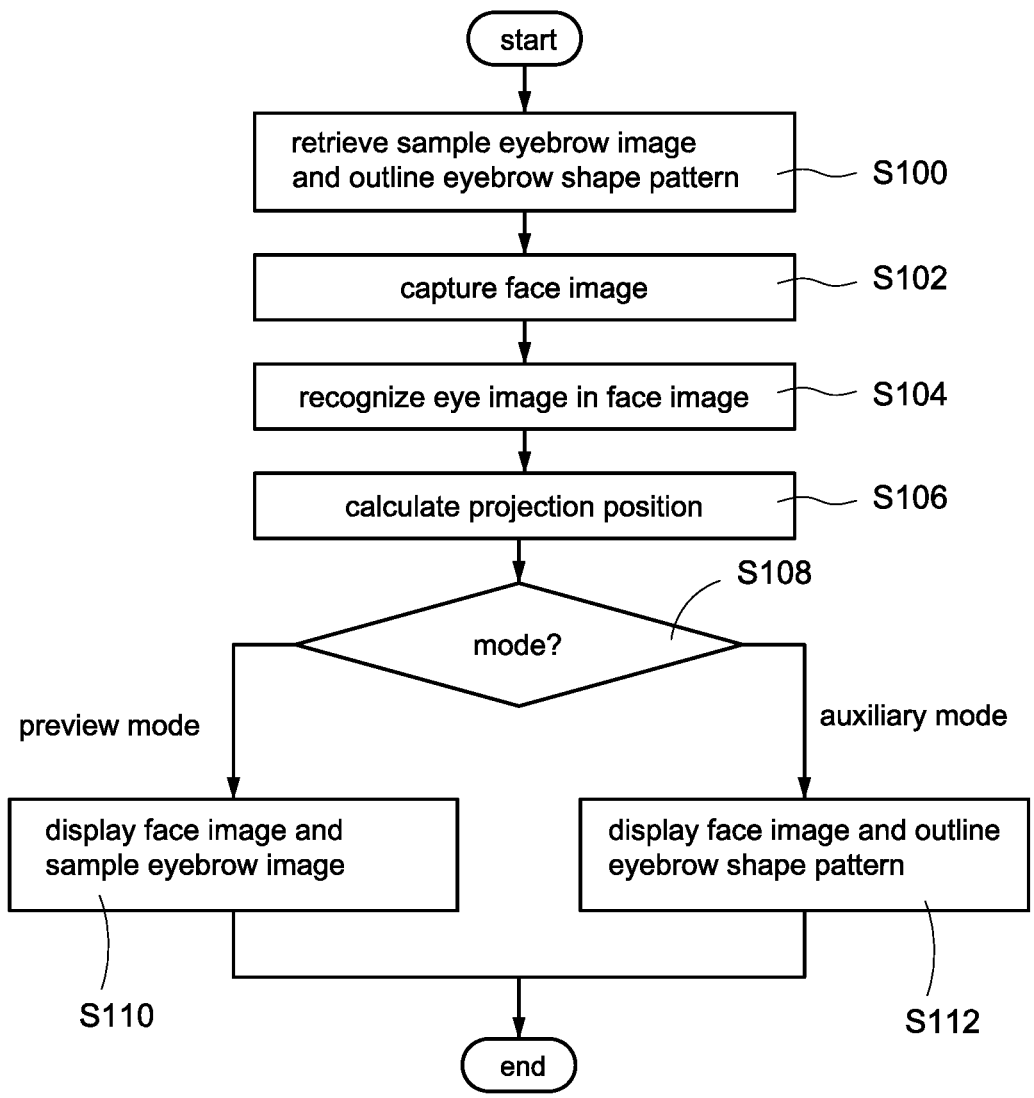
FIG. 6 is a flowchart of an eyebrow shape preview according to the first embodiment of the present disclosed example.

Please refer to FIG. 6, a step S106 is performed: the process unit 10 calculates the projection position(s) of the sample eyebrow image and the outline eyebrow shape pattern according to the position of the eye image and an eyebrow offset.

One of the exemplary embodiments, the memory 17 of the analysis apparatus 1 stores a plurality of eyebrow offsets, each eyebrow offset respectively corresponds to each sample eyebrow image. The analysis apparatus 1 retrieves the corresponding eyebrow offset after the user selected one of the sample eyebrow images in the step S100.

One of the exemplary embodiments, the process unit 10 calculates a distance between the eyebrows and the eyes of the user (comprising a distance between left eyebrow and left eye, and/or a distance between right eyebrow and right eye), and calculates the eyebrow offset according to the calculated distance. More specifically, the process unit 10 may select one of the eyebrow feature points (such as selecting the eyebrow tail feature point corresponding to the eyebrow tail) and one the eye feature points (such as selecting the eye tail feature point corresponding to the eye tail), and calculate the distance between the two selected feature points as the eyebrow offset.

One of the exemplary embodiments, the process unit 10 may calculates a specific position via moving vertically upwards the calculated eyebrow offset form a position of the selected eye tail feature point, and configures the specific position as the projection position.

Step S108: the process unit 10 determines whether the analysis apparatus 1 enters the preview mode or auxiliary mode.

One of the exemplary embodiments, the user may input a mode-switching operation via the electronic device 2 or the input interface 15 to control the analysis apparatus 1 to enter the preview mode for seeing the simulated eyebrow shape synthetic image, or control the analysis apparatus 1 to enter the auxiliary mode for obtaining auxiliary of eyebrow-shaping.

If the process unit 10 determines that the analysis apparatus 1 enters the preview mode, the process unit 10 performs the step S110. If the process unit 10 determines that the analysis apparatus 1 enters the auxiliary mode, the process unit 10 performs the step S112.

Step S110: the process unit 10 displays the face image of the user, and displays the sample eyebrow image at the projection position simultaneously via the display screen 111 during the analysis apparatus 1 entering the preview mode for showing an effect of Augmented Reality of synthesis of virtual sample eyebrow image and real face image of the user (as the display screen 53 shown in FIG. 11), wherein the displayed sample eyebrow image partially overlaps the displayed face image for completely expressing the appearance of the eyebrows.

One of the exemplary embodiments, the process unit 10 may paste the sample eyebrow image at the projection position of the face image via synthesis module 105 for obtaining the synthetic image. Then, the process unit 10 displays the synthetic image via display module 111.

Furthermore, the synthesis module may first erase the eyebrow image of the user in the face image, synthesize the face image and the sample eyebrow image, and execute an image process (such as anti-alias process or soft edge process) to the junction of the face image and the sample eyebrow image. Thus, the present disclosed example can make sure that the obtained synthetic image is not mixed with the original eyebrow image of the user, and enhance the authenticity of synthetic image.

The present disclosed example can allow the user to preview a result of eyebrow-shaping via a preview mode, select the suitable eyebrow shape, and effectively prevent the user from being dissatisfied with the shaped eyebrow shape. If the user is dissatisfied with the displayed synthetic image, the user may operate the analysis apparatus 1 to re-perform the steps S100-S110 for selecting another sample eyebrow image, generating another synthetic image according to another sample eyebrow image, and re-displaying the new synthetic image via the display module 111.

If the process unit 10 determines that the analysis apparatus 1 enters the auxiliary mode, the process unit 10 performs the step S112: the process unit 10 displays the face image of the user, and displays the outline eyebrow shape pattern 71-72 at the projection position during the analysis apparatus 1 entering the auxiliary mode for showing an effect of Augmented Reality of synthesis of virtual outline eyebrow shape pattern 71-72 and real face image of the user (as the display screen 54 shown in FIG. 12), wherein the displayed outline eyebrow shape pattern 71-72 partially overlaps the displayed face image for instructing the eyebrow shape and the range of the corresponding sample eyebrow image.

One of the exemplary embodiments, the process unit 10 may One of the exemplary embodiments, paste the outline eyebrow shape pattern 71-72 at the projection position of the face image via synthesis module 105 for obtaining the synthetic image. Then, the process unit 10 displays the synthetic image via display module 111.

The present disclosed example can assist the user in intuitive and accurate eyebrow-shaping via an auxiliary mode, reduce the technical threshold of eyebrow-shaping significantly, and increase a probability of shaping eyebrows successfully.

Furthermore, the user can see the real-time face image himself/herself, the selected outline eyebrow shape pattern 71-72 and its suggested position simultaneously on the mirror screen 11, shaping the user's eyebrows intuitively and accurately, reduce the technical threshold of eyebrow-shaping significantly, and increase a probability of shaping eyebrows successfully.

Figure 7A:
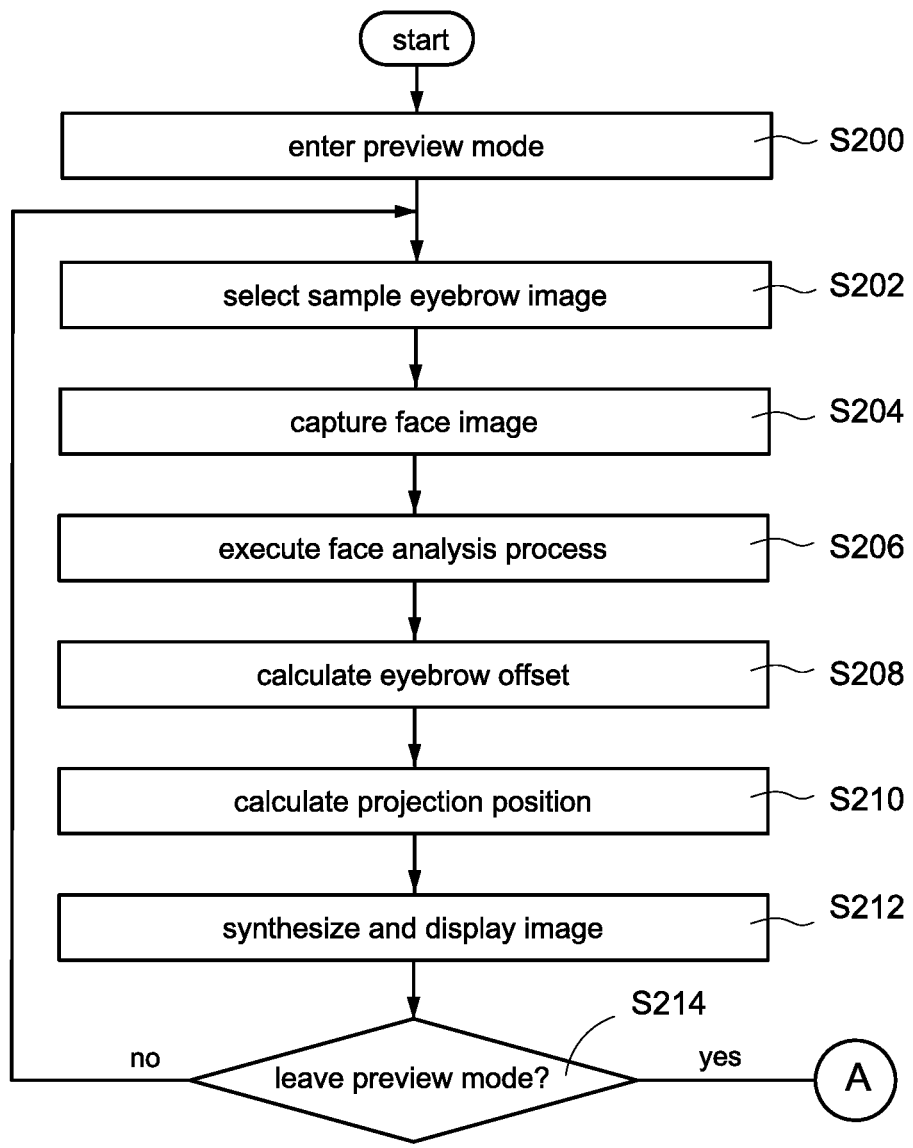
FIG. 7A is a first part of flowchart of an eyebrow shape preview according to the second embodiment of the present disclosed example.
Figure 7B:
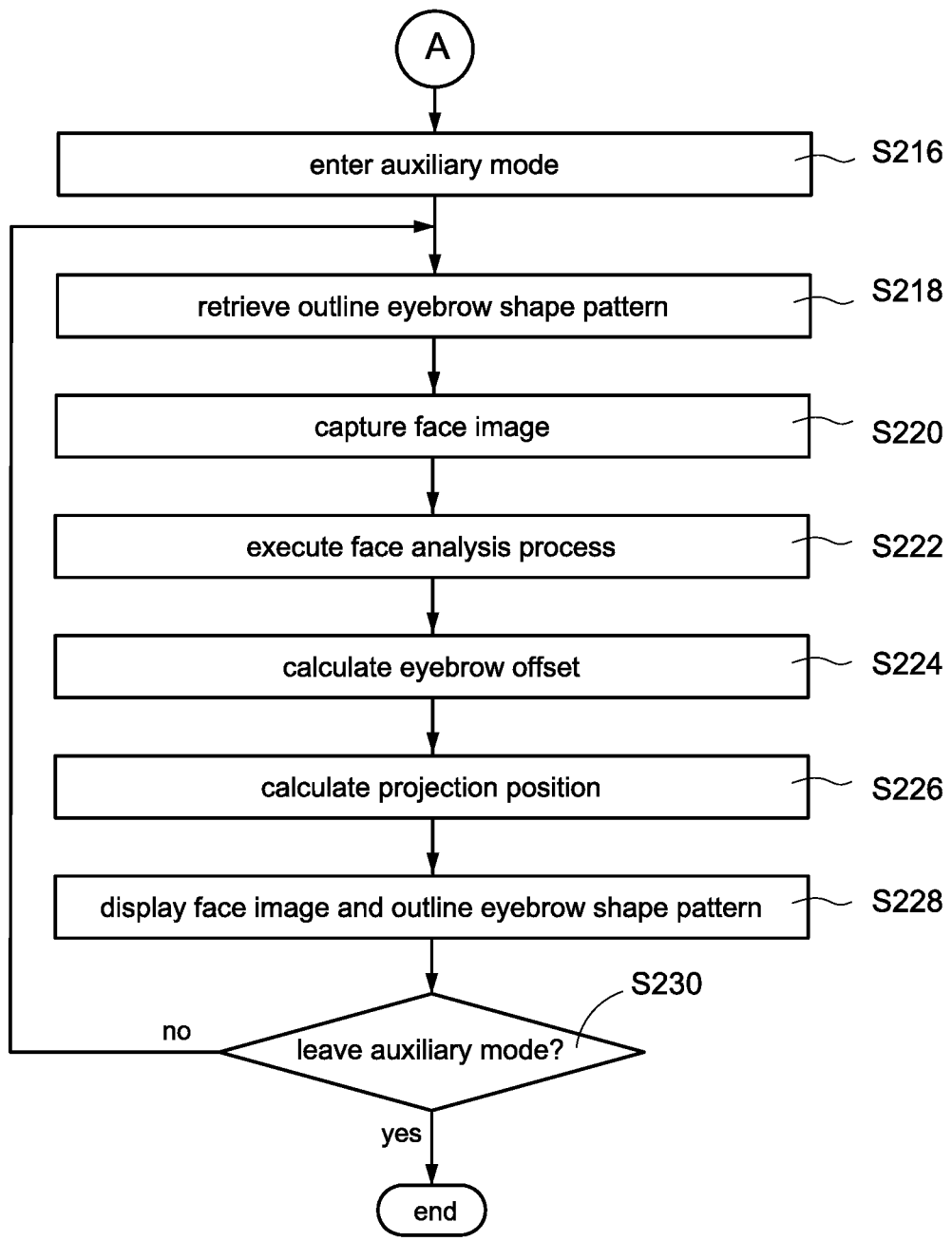
FIG. 7B is a second part of flowchart of an eyebrow shape preview according to the second embodiment of the present disclosed example.
Figure 13:
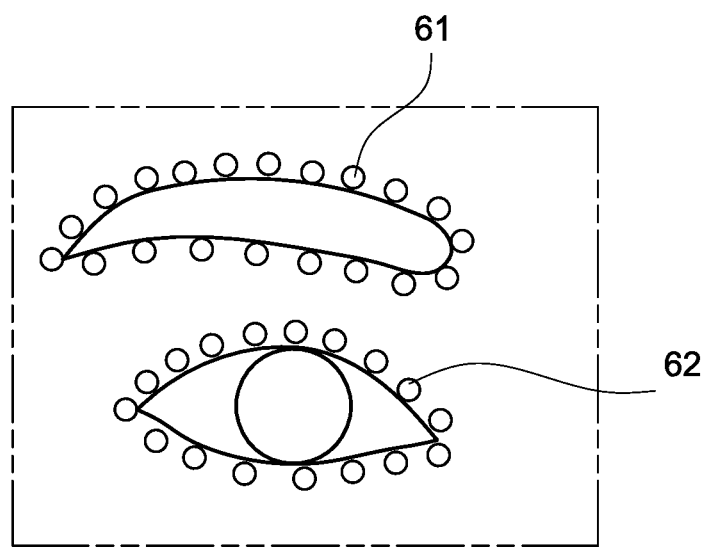
FIG. 13 is a first schematic view of calculation of a projection position according to the present disclosed example.
Figure 14:
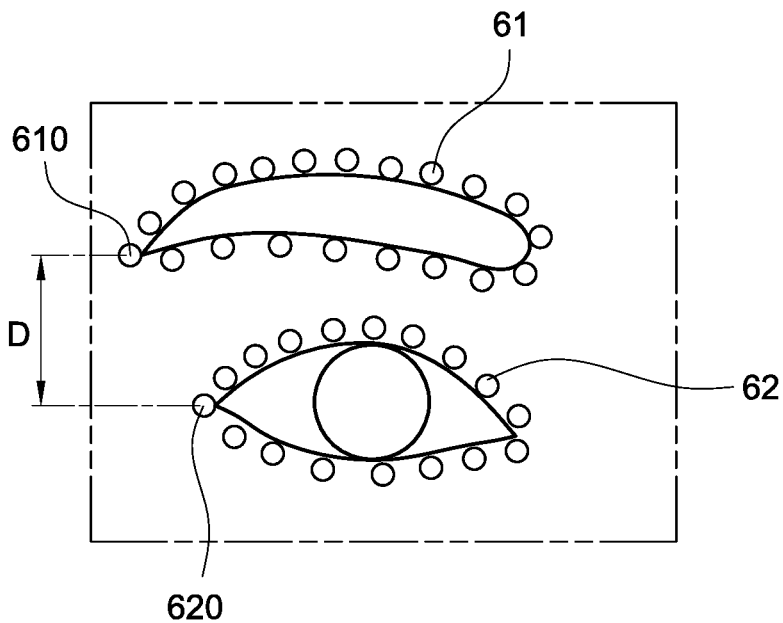
FIG. 14 is a second schematic view of calculation of a projection position according to the present disclosed example.
Figure 15:
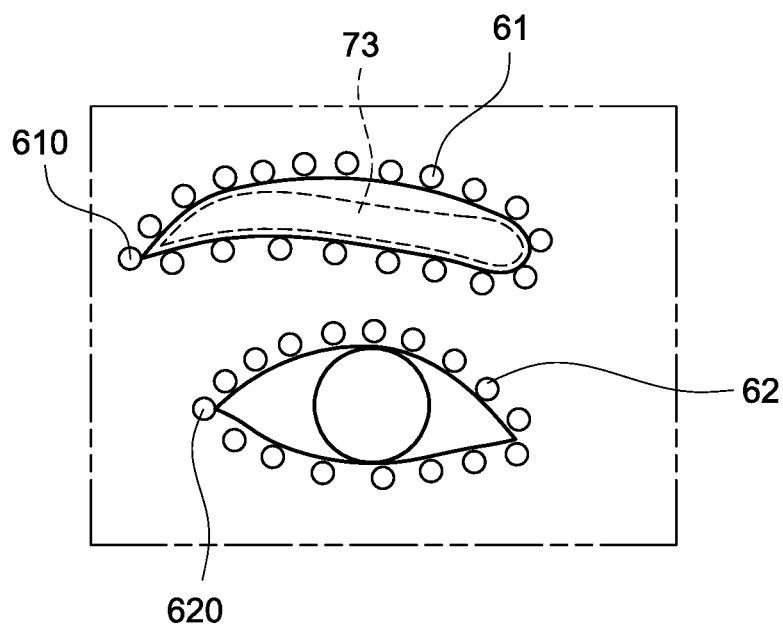
FIG. 15 is a third schematic view of calculation of a projection position according to the present disclosed example.

Please refer to FIG. 7A, FIG. 7B, and FIG. 13-15 simultaneously, FIG. 7A is a first part of flowchart of an eyebrow shape preview according to the second embodiment of the present disclosed example, FIG. 7B is a second part of flowchart of an eyebrow shape preview according to the second embodiment of the present disclosed example, FIG. 13 is a first schematic view of calculation of a projection position according to the present disclosed example, FIG. 14 is a second schematic view of calculation of a projection position according to the present disclosed example, and FIG. 15 is a third schematic view of calculation of a projection position according to the present disclosed example.

Compare to the embodiment shown in FIG. 6, the preview method of this embodiment controls the analysis apparatus 1 first to enter the preview mode for selecting the suitable sample eyebrow image by the user, and then enter the auxiliary mode for assisting the user in eyebrow-shaping.

The preview method of this embodiment comprises following steps.

Step S200: the process unit 10 of the analysis apparatus 1 enters preview mode according to a user operation or a preset schedule (such as seven a.m. every morning).

Step S202: the process unit 10 selects one of the sample eyebrow images according to the selection operation of the user, the selection command or the default value.

Step S204: the process unit 10 controls the image capture module 12 to shoot the face of the user for retrieving the face image of the user.

Step S206: the process unit 10 executes the face analysis process to the captured face image 51 for recognizing the eye image(s) in the face image 51.

Step S208: the process unit 10 calculates the eyebrow offset according to the position of the eye image.

For example, as shown in FIG. 13, after the execution of the face analysis process, the process unit 10 may recognize a plurality of eye feature points 62 of the eye image, and a plurality of eyebrow feature points 61 of the eyebrow image, wherein the eye feature points 62 respectively correspond to a plurality of different features of the eye, the eyebrow feature points 61 respectively correspond to a plurality of different features of the eyebrow.

Then, as shown in FIG. 14, the process unit 10 selects one of the eyebrow feature points 61 (such as selecting the eyebrow tail feature point 610 corresponding to the eyebrow tail) and one the eye feature points 62 (such as selecting the eye tail feature point 620 corresponding to the eye tail), calculates the distance between the selected eyebrow feature point 610 and the selected eye feature point 620, and configures the calculated distance as the eyebrow offset.

One of the exemplary embodiments, the process is to calculate a vertical distance D between the two features points, and configure the vertical distance D as the eyebrow offset.

Step S210: the process unit 10 calculates the projection position of the sample eyebrow image and the outline eyebrow shape pattern according to the position of the eye image and the eyebrow offset.

For example, as shown in FIG. 15, the process unit 10 may calculates a specific position via moving vertically upwards the eyebrow offset form a position of the eye tail feature point 620 corresponding to the eye tail, and configures the specific position as the projection position (such as the projection position 73).

Please be noted that although the FIG. 13-15 takes calculating the eyebrow offset of the left eyebrow and left eye for example, but this specific example is not intended to limit the scope of the present disclosed example. There is another example taking calculating the eyebrow offset of the right eyebrow and right eye for example. Besides, the process unit 10 of the present disclosed example may first selectively calculate the eyebrow offset between the left eyebrow and left eye, calculate the eyebrow offset between the right eyebrow and right eye, or calculate the two eyebrow offsets via multi-processing simultaneously.

Step S212: the process unit 10 pastes the sample eyebrow image at the projection position of the face image for obtaining the synthetic image, and displays the synthetic image via the display module 111 for leading the user to determine whether the selected eyebrow shape is suitable for himself/herself. One of the exemplary embodiments, the process unit 10 further executes an image process for removing the image of original eyebrow of the user and leaving the sample eyebrow image.

Step S214: the process unit 10 determines whether the analysis apparatus 1 leaves the preview mode.

After the user operates the electronic device 2 to send a confirmation command or operates the input interface 15 to input a confirmation operation, the process unit 10 may determines that the user wants to shape eyebrow according to the current selected sample eyebrow image, and leaves the preview mode automatically. Otherwise, the process unit 10 determines that the analysis apparatus 1 doesn't leave the preview mode and performs the steps S202-S212 again for leading the user to select and preview another sample eyebrow image.

Step S216: the process unit 10 controls the analysis apparatus 1 to enter the auxiliary mode. Step S218: the process unit 10 retrieves the outline eyebrow shape pattern corresponding to the confirmed sample eyebrow image.

One of the exemplary embodiments, there are a plurality of sample feature points being configured on the sample eyebrow image, the process unit connects the sample feature points for rendering the corresponding outline eyebrow shape pattern via the rendering module 104.

Then, the process unit 10 perform the steps S220-S226. The steps S220-S226 is the same or similar as the steps S204-S210, the relevant description is omitted for brevity.

Then, the process unit 10 performs a step S228: the process unit 10 displays the face image of the user and displays the outline eyebrow shape pattern at the projection position simultaneously via the display module 111.

Step S230: the process unit 10 determines whether the analysis apparatus leaves the auxiliary mode.

After the user complete the eyebrow-shaping and operates the electronic device 2 to send a shutdown command or operates the input interface 15 to input a shutdown operation, the process unit 10 may determines that the user had completed the eyebrow-shaping, and leaves the auxiliary mode automatically. Otherwise, the process unit 10 determines that the analysis apparatus doesn't leave the auxiliary mode, and performs the steps S218-S228 again for continuing to provide users with assistance of eyebrow-shaping.

Please be noted that via performing the steps S200-S214 repeatedly in the preview mode, the present disclosed example can re-calculate the new projection position, re-synthesize the image, and display the new synthetic image immediately after the position of the face of the user is changed, so as to make the synthetic image displayed by the mirror screen 11 corresponding to the motion of the user and implement the effect of Augmented Reality. Moreover, via performing the steps S218-S230 repeatedly in the auxiliary mode, the present disclosed example can re-calculate the new projection position, re-project the outline eyebrow shape pattern, and display the new outline eyebrow shape pattern immediately after the position of the face of the user is changed, so as to make the outline eyebrow shape pattern displayed by the mirror screen 11 corresponding to the motion of the user and implement the effect of Augmented Reality.

Please be noted that the face shape or size of each people may be not completely the same in general. Thus, If the different users shape their eyebrows according to the completely same sample eyebrow image, a ratio of shaped eyebrow may be not matched with the people's face shape or size, and look not natural enough.

For solve above-mentioned problem, the present disclosed example further provides a function of eyebrow modification having ability of adjustment of shape, angle or projection position of the mirror eyebrow shape pattern according to the shape, angle or position before eyebrow-shaping of the eyebrow, so as to make the shaped eyebrows look natural.

Figure 8:
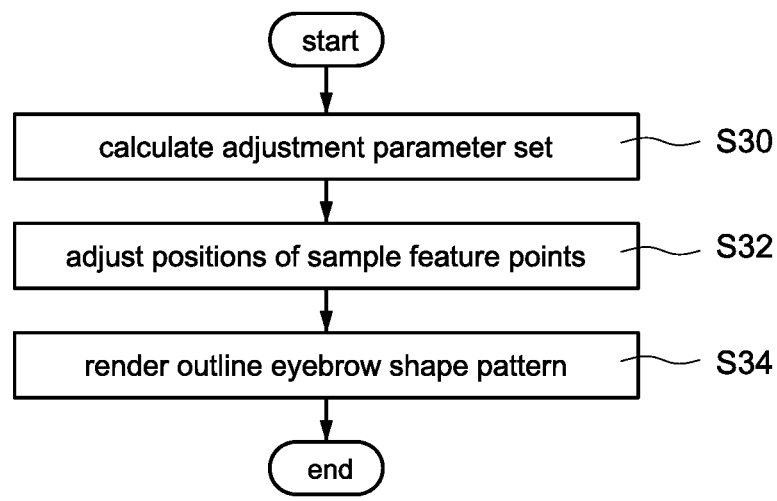
FIG. 8 is a flowchart of an eyebrow shape preview according to the third embodiment of the present disclosed example.

Please refer to FIG. 6, FIG. 8, and FIG. 16-19B simultaneously, FIG. 8 is a flowchart of an eyebrow shape preview according to the third embodiment of the present disclosed example, FIG. 16 is a first schematic view of feature analysis according to the present disclosed example, FIG. 17 is a second schematic view of feature analysis according to the present disclosed example, FIG. 18A is a schematic view of a projection position before adjustment according to the present disclosed example, FIG. 18B is a schematic view of a projection position after adjustment according to the present disclosed example, FIG. 19A is a schematic view of an eyebrow shape before adjustment according to the present disclosed example, and FIG. 19B is a schematic view of an eyebrow shape after adjustment according to the present disclosed example.

In this embodiment, the process unit 10 execute a face analysis process to the face image via the face analysis module 101 for recognizing a plurality of first eyebrow feature points (as shown in FIG. 16) of the first eyebrow image 74 (such as right eyebrow) and a plurality of second eyebrow feature points (as shown in FIG. 17) of the second eyebrow image 75 (such as left eyebrow), establishes an eyebrow data set (the first eyebrow data set) according to the first eyebrow feature points, establishing the first eyebrow data set according to the first eyebrow feature points and establishing the second eyebrow data set according to the second eyebrow feature points.

Besides, the process unit 10 may further retrieve a plurality of sample feature points (take the sample feature points 650-652 of the sample eyebrow image corresponding to the right eyebrow for example in FIG. 18A, the sample feature point 650 corresponds to the eyebrow head (eyebrow head sample feature point) of the sample eyebrow image, the sample feature point 651 corresponds to the eyebrow peak (eyebrow peak sample feature point) of the sample eyebrow image, and the sample feature point 652 corresponds to the eyebrow tail (eyebrow tail sample feature point) of the sample eyebrow image) of the selected sample image data, and establish the sample data set according to the sample feature points 650-652.

One of the exemplary embodiments, three of the first eyebrow feature points 630-632 and three of the second eyebrow feature points 640-642 respectively correspond to eyebrow head, eyebrow peak and eyebrow tail of the user. More specifically, the first eyebrow feature point 630 (first eyebrow tail feature point) and the second eyebrow feature point 640 (second eyebrow tail feature point) correspond to eyebrow tail, the first eyebrow feature point 631 (first eyebrow peak feature point) and the second eyebrow feature point 641 (second eyebrow peak feature point) correspond to eyebrow peak, and the first eyebrow feature point 632 (first eyebrow head feature point) and the second eyebrow feature point 642 (second eyebrow head feature point) correspond to eyebrow head.

Following description takes adjusting the sample feature points 650-652 corresponding to the right eyebrow according to the first eyebrow feature points 630-632 corresponding to the right eyebrow for example, but this specific example is not intended to limit the scope of the present disclosed example. Following adjustment steps may be used to adjust the left eyebrow.

Moreover, in this embodiment, the adjusted positions of the sample feature points may be used to calculate above-mentioned projection position. The preview method of this embodiment comprises steps S30-S34 for implementing the function of modification of the sample eyebrow image.

Step S30: the process unit 10 calculates the adjustment parameter set (this example is to calculate the adjustment parameter set of the right eyebrow according to the second eyebrow data set and the sample data set of the right eyebrow) of the eyebrow according to the sample data set and the eyebrow data set as the reference.

One of the exemplary embodiments, above-mentioned adjustment parameter set comprises a translation parameter, a rotation parameter and a scaling parameter.

One of the exemplary embodiments, the calculation module 102 calculates above-mentioned adjustment parameter set by combination of the Rigid Registration system and the Least-Square Estimation Algorithm. The Rigid Registration system and the Least-Square Estimation Algorithm are the commonly technologies in the art of the present disclosed example. The Rigid Registration system and the Least-Square Estimation Algorithm may analyze two data (such as the first eyebrow feature points 630-632 and the sample feature points 650-652) and generate an adjustment parameter set according to a difference between the two data. After the calculated adjustment parameter set is used to execute a transformation process to one of the data (such as the sample feature points 650-652), the transformed data has high similarity with another data (the first eyebrow feature points 630-632).

One of the exemplary embodiments, the calculation module 102 calculates the adjustment parameter set according to each eyebrow feature point and each sample feature point corresponding to the same feature of the eyebrow. For example, the calculation module 102 compares the eyebrow head feature point with the eyebrow head sample feature point, compares the eyebrow peak feature point with the eyebrow peak sample feature point, compares the eyebrow tail feature point with the eyebrow tail sample feature point, and calculates the adjustment parameter set according to each comparison result.

Step S32: the process unit 10 adjusts the positions (as shown in FIG. 18A) of the sample feature points 650-652 according to the calculated adjustment parameter set for making the sample feature points 650'-652' (as shown in FIG. 18B) which their positions had been adjusted have high similarity with the first eyebrow feature points 630-632 corresponding to the eyebrow not shaping.

One of the exemplary embodiments, the calculation module 103 transforms the positions of the sample feature points for translating the pattern enclosed by the sample feature points according to the translation parameter, transforms the positions of the sample feature points for rotating the pattern enclosed by the sample feature points according to the rotation parameter, transforms the positions of the sample feature points for scaling the pattern enclosed by the sample feature points according to the scaling parameter.

Please refer to FIG. 18A, FIG. 18B, FIG. 19A and FIG. 19B. As shown in figures, before transformation of positions according to the adjustment parameter set, there is a great difference between the pattern 90 enclosed by the sample feature points 650-652 and the pattern 91 enclosed by the first eyebrow feature points 360-632 (corresponding to the eyebrow not shaping). Above situation makes the user must shape his/her eyebrow significantly. Moreover, both eyebrows will be overly consistent with each other after eyebrow-shaping and look not natural enough.

After transformation of positions according to the adjustment parameter set, the pattern 92 enclosed by the transformed sample feature points 650'-652' are more similar as the pattern 91. Above situation makes the user have not to shape his/her eyebrow significantly. Moreover, both shaped eyebrows look natural because of a slight difference between both shaped eyebrows.

Step S34: the process unit 10 renders the outline eyebrow shape pattern according to the transformed sample feature points 650'-652'. After the execution of the S34, the process unit 10 may display the outline eyebrow shape pattern rendered according to the sample feature points 650'-652' in the auxiliary mode for assisting the user in eyebrow-shaping.

The present disclosed example can implement the function of eyebrow modification and make the shaped eyebrows look natural effectively.

The above-mentioned are only preferred specific examples in the present disclosed example, and are not thence restrictive to the scope of claims of the present disclosed example. Therefore, those who apply equivalent changes incorporating contents from the present disclosed example are included in the scope of this application, as stated herein.

What is claimed is:

1. An eyebrow shape preview method with augmented reality applied to a body information analysis apparatus, comprising following steps of:
   a) controlling an image capture module of the body information analysis apparatus to capture a face image;
   b) controlling a process unit of the body information analysis apparatus to recognize an eye image in the face image;
   c) recognizing a plurality of eyebrow feature points of an eyebrow image in the face image, wherein the eyebrow feature points respectively correspond to a plurality of different features of an eyebrow;
   d) selecting one of a plurality of sample eyebrow images, wherein there are a plurality of sample feature points configured on each sample eyebrow image, the sample feature points respectively correspond to the different features of the eyebrow;
   e) calculating a projection position for the selected sample eyebrow image according to a position of the eye image and an eyebrow offset to the eye image;
   f) calculating an adjustment parameter set according to each of the eyebrow feature points and each of the sample feature points of the selected sample eyebrow image corresponding to the same feature of the eyebrow, wherein the adjustment parameter set comprises a translation parameter, a rotation parameter and a scaling parameter;
   g) adjusting a plurality of positions of the sample feature points according to the adjustment parameter set for adjusting the sample eyebrow image being selected;
   h) synthesizing the face image and the sample eyebrow image being adjusted into a synthetic image used to completely express appearance of the sample eyebrow image being adjusted on the face image according to the projection position, and controlling a display module of the body information analysis apparatus to display the synthetic image in a preview mode; and
   i) rendering an outline eyebrow shape pattern according to the adjusted positions of the sample feature points, and controlling the display module to display the face image, and display the outline eyebrow shape pattern used to instruct outline or range of the sample eyebrow image being adjusted at the projection position in an auxiliary mode.

2. The eyebrow shape preview method according to claim 1, wherein the step b) comprises a step b1) recognizing a plurality of eye feature points of the eye image, wherein the eye feature points respectively correspond to a plurality of different features of an eye and are used indicate a position of the eye.

3. The eyebrow shape preview method according to claim 2, wherein the eye feature points comprise an eye tail feature point corresponding to an eye tail, and the step c) comprises:
   e1) retrieving the eyebrow offset; and
   e2 obtaining the projection position via moving vertically upwards the eyebrow offset form a position of the eye tail feature point.

4. The eyebrow shape preview method according to claim 3, wherein the different eyebrow offsets and the sample eyebrow images (81,82) are prestored in a memory (17) of body information analysis apparatus (1), the different eyebrow offsets respectively correspond to the sample eyebrow images (81,82), the step d) is configured to select one of the sample eyebrow images (81,82) according to a selection command or a selection operation, the step e1) is configured to retrieve the eyebrow offset corresponding to the selected sample eyebrow image (81,82) from the different eyebrow offsets.

5. The eyebrow shape preview method according to claim 1, wherein the eyebrow feature points comprise an eyebrow tail feature point corresponding to an eyebrow tail, the step e1) comprises a step e11) calculating a distance between the eyebrow tail feature point and the eye tail feature point, and configuring the distance as the eyebrow offset.

6. The eyebrow shape preview method according to claim 5, wherein the step e11) is configured to calculate a vertical distance between the eyebrow tail feature point and the eye tail feature point, and configure the vertical distance as the eyebrow offset.

7. The eyebrow shape preview method according to claim 1, wherein three of the eyebrow feature points and three of the sample feature points respectively correspond to an eyebrow head, an eyebrow peak and an eyebrow tail of the eyebrow.

8. A body information analysis apparatus with augmented reality, comprising:
   an image capture module used to capture a face image;
   a process unit electrically connected to the image capture module, comprising a face analysis module, a synthesis module, an adjustment module and a rendering module, the process unit recognizing an eye image in the face image, the process unit recognizing by the face analysis module a plurality of eyebrow feature points of an eyebrow image in the face image and a plurality of eye feature points of the eye image, the eye feature points respectively corresponding to a plurality of different features of an eye, the eyebrow feature points respectively corresponding to a plurality of different features of an eyebrow, the process unit selecting one of a plurality of sample eyebrow images, there are a plurality of sample feature points configured on each sample eyebrow image, the sample feature points respectively correspond to the different features of the eyebrow, the process unit calculating a projection position for the sample eyebrow image being selected according to a position of the eye image and an eyebrow offset to the eye image, the process unit, by the adjustment module, calculating an adjustment parameter set according to each of the eyebrow feature point and each of the sample feature point corresponding to the same feature of the eyebrow,
   adjusting a plurality of positions of the sample feature points according to the adjustment parameter set for adjusting the sample eyebrow image, the adjustment parameter set comprising a translation parameter, a rotation parameter and a scaling parameter, the process unit synthesizing by the synthesis module the face image and the sample eyebrow image being adjusted into the synthetic image used to completely express appearance of the sample eyebrow image being adjusted on the face image according to the projection position in a preview mode, the process unit rendering by the rendering module an outline eyebrow shape pattern according to the adjusted positions of the sample feature points; and a display module, displaying a synthetic image in the preview mode, the display module displaying the face image and displaying the outline eyebrow shape pattern used to instruct outline or range of the sample eyebrow image being adjusted at the projection position in an auxiliary mode.

9. The body information analysis apparatus according to claim 8, wherein the eye feature points comprise an eye tail feature point corresponding to an eye tail, the process unit further comprises a calculation module, the calculation module calculates the projection position via moving vertically upwards the eyebrow offset form a position of the eye tail feature point.

10. The body information analysis apparatus according to claim 8, wherein the body information analysis apparatus further comprises:

a memory electrically connected to the process unit, the memory storing the sample eyebrow images and the different eyebrow offsets, wherein the sample eyebrow images respectively corresponding to the different eyebrow offsets;

an input interface electrically connected to the process unit, the input interface being used to receive a selection operation of selecting one of the sample eyebrow images; and a wireless transmission module connected to an electronic device, the wireless transmission module being used to receive a selection command of selecting one of the sample eyebrow images from the electronic device.

11. The body information analysis apparatus according to claim 8, wherein the process unit further comprises a calculation module, the calculation module is used to calculate a vertical distance between the eyebrow feature point corresponding to an eyebrow tail and the eye feature point corresponding to an eye tail, and configure the vertical distance as the eyebrow offset.

12. The body information analysis apparatus according to claim 8, wherein three of the eyebrow feature points and three of the sample feature points respectively correspond to an eyebrow head, an eyebrow peak and an eyebrow tail of the eyebrow.

* * * * *